(12) United States Patent
Seibert et al.

(10) Patent No.: US 8,128,807 B2
(45) Date of Patent: Mar. 6, 2012

(54) FCC SEPARATOR WITHOUT A REACTOR

(75) Inventors: Kelly D. Seibert, Carpentersville, IL (US); Todd P. Mitchell, Bartlett, IL (US); Mindy B. Kuhn, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 12/751,390

(22) Filed: Mar. 31, 2010

(65) Prior Publication Data
US 2010/0187158 A1 Jul. 29, 2010

Related U.S. Application Data

(62) Division of application No. 11/323,099, filed on Dec. 30, 2005, now Pat. No. 7,718,140.

(51) Int. Cl.
*C10G 11/18* (2006.01)
(52) U.S. Cl. ............................ 208/113; 208/106; 55/345
(58) Field of Classification Search ................. 208/106, 208/113; 55/339, 340, 345, 348
See application file for complete search history.

(56) References Cited

U.S. PATENT DOCUMENTS

| | | | | |
|---|---|---|---|---|
| 5,221,301 A | * | 6/1993 | Giuricich | 55/345 |
| 5,314,611 A | * | 5/1994 | Cetinkaya | 208/113 |
| 5,370,844 A | * | 12/1994 | Peterson | 422/147 |
| 5,690,709 A | * | 11/1997 | Barnes | 55/348 |
| 2006/0130444 A1 | * | 6/2006 | Smith et al. | 55/345 |

FOREIGN PATENT DOCUMENTS

WO WO 01/58568 * 8/2001

* cited by examiner

*Primary Examiner* — Walter D Griffin
*Assistant Examiner* — Renee E Robinson
(74) *Attorney, Agent, or Firm* — James C Paschall

(57) ABSTRACT

This invention is directed to a process for fluid catalytic cracking, including, fluidizing a hydrocarbon stream in a riser, cracking the hydrocarbon stream with catalyst in the riser to produce a cracked stream and spent catalyst, separating the cracked stream and the spent catalyst in a primary separator to obtain a cracked stream with a first concentration of spent catalyst, and transporting the cracked stream with the first concentration of spent catalyst through a conduit to a multi-cyclone separator comprising multiple cyclones extending through a tube sheet to obtain a cracked stream with a second concentration of spent catalyst. The invention is also directed to an apparatus for catalytic cracking including a riser, a primary separator, a disengagement vessel surrounding the primary separator to collect the catalyst, a gas conduit having a first end in fluid connection with the disengagement vessel, and a multi-cyclone separator comprising a plurality of cyclones.

5 Claims, 2 Drawing Sheets

FCC SEPARATOR WITHOUT A REACTOR

BACKGROUND OF THE INVENTION

This invention is directed to a method and an apparatus for catalytically cracking heavy hydrocarbons and separating the spent catalyst from the cracked product stream.

DESCRIPTION OF THE PRIOR ART

Fluid catalytic cracking (FCC) is a catalytic conversion process of heavy hydrocarbons into lighter hydrocarbons accomplished by contacting the heavy hydrocarbons in a fluidized reaction zone with a catalyst composed of finely divided particulate material. Most FCC units now use zeolite-containing catalyst having high activity and selectivity.

The basic components of the FCC process include a riser, a reactor vessel for disengaging spent catalyst from product vapors, a regenerator and a catalyst stripper. In the riser, the hydrocarbon feed contacts the catalyst and is cracked into a product stream containing lighter hydrocarbons. In the riser, regenerated catalyst and the hydrocarbon feed are transported upward by the expansion of the gases that result from the vaporization of the hydrocarbons, and other fluidizing mediums, upon contact with the hot catalyst. Upon contact with the catalyst the hydrocarbon feed is cracked into lower molecular weight products. Coke accumulates on the catalyst particles as a result of the cracking reaction and the catalyst is then referred to as "spent catalyst." The spent catalyst must be removed from the cracked products to reduce catalyst losses from the system and to avoid contamination of the products. High temperature regeneration burns coke from the spent catalyst. The regenerated catalyst is then returned to the reaction zone. Spent catalyst is continually removed from the reaction zone and replaced by essentially coke-free catalyst from the regeneration zone.

The current state of the art FCC reactor design includes a riser external to the reactor vessel that continues into the reactor vessel and typically terminates in a primary separation device. After leaving the primary separation device the reactor vapors and entrained catalyst enter into a secondary catalyst separation device, which may be cyclones. The reaction vapors leaving the cyclones are further combined typically in a plenum chamber before exiting the reactor and flowing to the main column. The outlet of the internal riser, the primary separation device, the cyclones and the plenum chamber are all contained within a large reactor vessel. The reactor is very large and therefore costly to manufacture and construct. The reactor vessel also adds costs to the FCC operation due to the amount of steam required for catalyst fluidization and dome steam for reactor vessel purging. It is preferable to reduce the amount of utilities necessary to maintain the reactor operation.

SUMMARY OF THE INVENTION

This invention is directed to a process for fluid catalytic cracking, including, fluidizing a hydrocarbon stream in a riser, cracking the hydrocarbon stream with catalyst in the riser to produce a cracked stream and spent catalyst, separating the cracked stream and the spent catalyst in a primary separator to obtain a cracked stream with a first concentration of spent catalyst, and transporting the cracked stream with the first concentration of spent catalyst through a conduit to a multi-cyclone separator comprising multiple cyclones extending through a tube sheet to obtain a cracked stream with a second concentration of spent catalyst. The invention may also include regenerating and recycling the regenerated catalyst to the riser. The invention may also include collecting the spent catalyst in a collection vessel below the third stage separator after the further separating step. The further separating step may include providing differential pressure in the third stage separator. In another aspect of the invention, the spent catalyst may be in a disengagement vessel encircling the primary separator prior to the regenerating step.

In still another aspect, the invention is directed to an apparatus for catalytic cracking including a riser, a primary separator located proximate an outlet end to substantially separate the catalyst from the cracked stream, a disengagement vessel surrounding the primary separator to collect the catalyst, a gas conduit having a first end in fluid connection with the disengagement vessel, and a multi-cyclone separator comprising a plurality of cyclones extending through a tube sheet and a second end of the gas conduit in fluid connection with the multi-cyclone separator. The collection vessel may be flowably connected to the disengagement vessel at a position below the primary separator.

In another aspect of the invention, the disengagement vessel has a top above the outlet end and the top and the multi-cyclone separator are connected by a conduit that redirects flow by about 180 degrees. The invention may also include an outflow line for channeling the cracked stream leaving the multi-cyclone separator and a pressure controller on the outflow line creates differential pressure in the separator. The disengagement vessel may also include baffles that encircle the riser below the primary separator. The collection vessel may be flowably connected to the disengagement vessel at a position above the baffles.

DETAILED DESCRIPTION OF THE INVENTION

Figure 1:
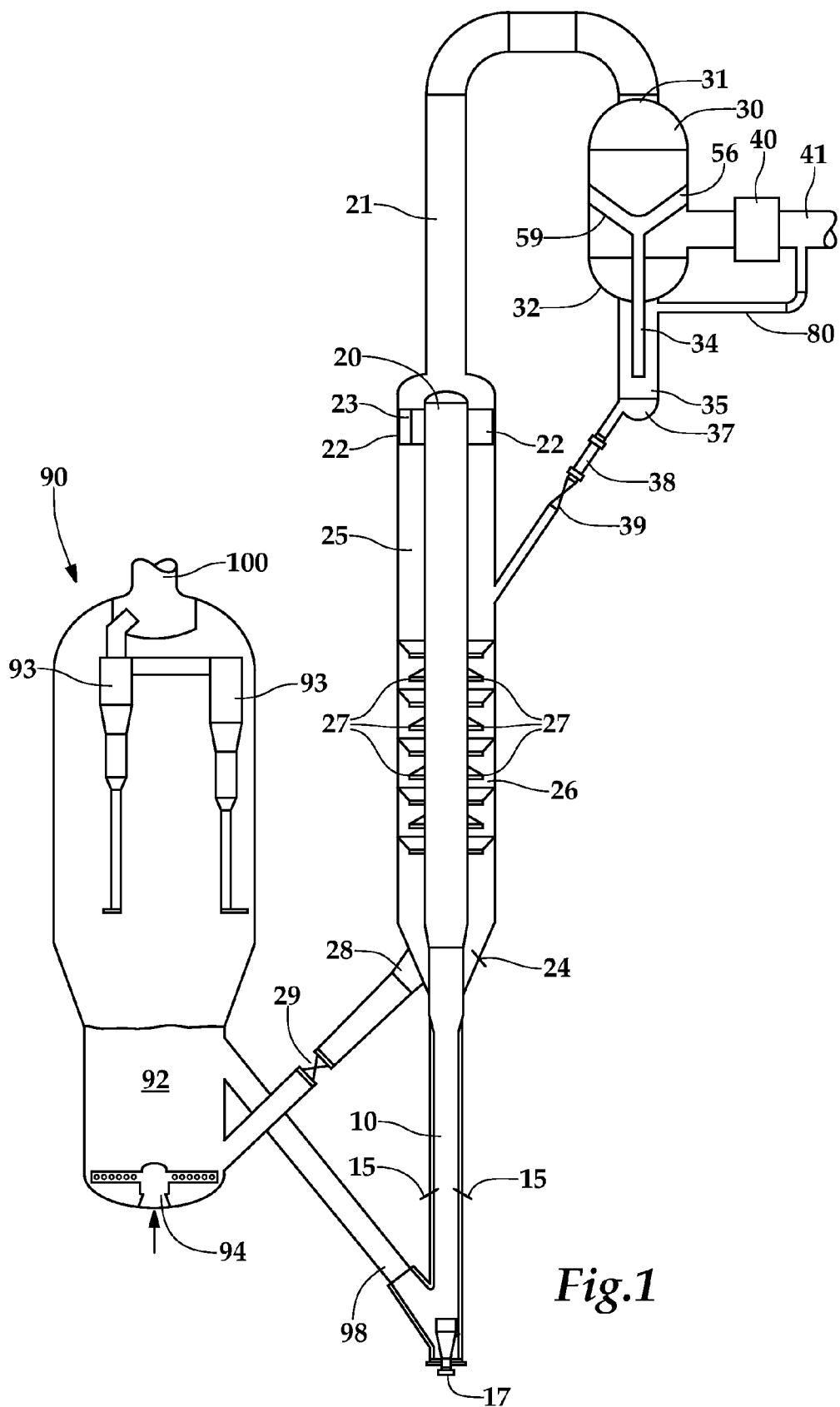
FIG. 1 is cross-sectional elevation view of an FCC apparatus with a riser, a primary separator, and a multi-cyclone separator.

An FCC reaction may occur without a reactor vessel and the spent catalyst may be separated from the cracked stream first in primary separator 20 and then in multi-cyclone separator 30. Heavy hydrocarbon feed may be added to riser 10 via feed injection nozzles 15. The cracking reaction may be mostly completed in riser 10 and produce a cracked stream. The spent catalyst and the cracked products may be separated at primary separator 20 located on top of riser 10. The separated spent catalyst may travel downwardly through disengagement vessel 25 and into a regenerator 90. Catalyst may be regenerated in the regenerator 90 by combustion with air. The cracked stream with some entrained spent catalyst may be carried upwardly into a multi-cyclone separator 30 for separating substantially all of the entrained spent catalyst. The cracked stream may then go to a main column (not shown) for initiation of cracked product separation.

As shown in FIG. 1, a hydrocarbon feed stream may be fed to a riser 10 at feed injection nozzles 15 and may be contacted and vaporized by hot regenerated catalyst entering through the nozzles 15 and fluidized by a gas such as steam from a nozzle 17. The catalyst cracks the hydrocarbon feed stream and a mixture of spent catalyst particles and gaseous cracked hydrocarbons exit discharge openings 23 (only one shown) in swirl arms 22 into a disengagement vessel 25. Tangential discharge of gases and spent catalyst from the swirl arms 22 produce a swirling helical motion about the interior of the disengagement vessel 25, causing heavier catalyst particles to fall down a stripping section 26 of the disengagement vessel 25. The spent catalyst particles may be stripped of entrained cracked vapors over baffles 27 with a stripping medium such as steam entering from at least one stripping nozzle 24. At least about 90 wt-%, and preferably at least about 95 wt-%, of the spent catalyst may be separated from the cracked stream by a primary separator 20. The spent catalyst particles disengaged by the primary separator 20 may be the first concentration of spent catalyst separated from the cracked stream.

Tangential discharge of cracked stream vapor and spent catalyst from the swirl arms 22 may produce a swirling helical motion about the interior of the disengagement vessel 25 causing heavier catalyst particles to fall downwardly through the baffles 27 and a mixture of spent catalyst entrained in vaporous cracked products to travel upwardly into a transport conduit 21 which makes a U-bend into a multi-cyclone separator 30.

Continuing with FIG. 1, stripped spent catalyst from the stripping section 26 of the disengagement vessel 25 may travel through a spent catalyst pipe 28 regulated by a control valve 29 into the regenerator 90. The spent catalyst may be distributed into a dense bed 92 by a distributor 94 where high temperatures in the presence of oxygen will combust the coke from the catalyst particles and regenerate, or restore, the activity of the catalyst particles. The entrained regenerated catalyst may be separated from the regeneration gases by cyclones 93 with the catalyst particles falling back towards the dense bed 92. The regenerated catalyst may be returned to the bottom of the riser 10 by a return conduit 98. Regeneration flue gas may exit the regenerator 90 by a flue gas outlet 100.

The temperature in the riser 10 may be between about 454° C. and about 593° C. (between about 850° F. and about 1100° F.), preferably between about 482° C. and about 566° C. (between about 900° F. and about 1050° F.), and more preferably between about 510° C. and about 538° C. (between about 950° F. and about 1000° F.). The regenerator 90 may regenerate catalyst at between about 593° C. and about 896° C. (between about 1100° F. and about 1500° F.), preferably between about 649° C. and about 760° C. (between about 1200° F. and about 1400° F.), more preferably between about 660° C. and about 732° C. (between about 1220° F. and about 1350° F.).

After the FCC reaction, the gaseous mixture of gaseous cracked hydrocarbons and entrained spent catalyst particles may leave the disengagement vessel 25 and travel up and down the transport conduit 21 and enter the multi-cyclone separator 30. The transport conduit 21 may extend vertically upwardly from the disengagement vessel 25 and bend about 90 degrees to extend horizontally and then bend about 90 degrees to extend vertically downwardly to connect to the top of the multi-cyclone separator 30. The transport conduit 21 may bend about 180 degrees between the disengagement vessel 25 and the multi-cyclone separator 30.

Figure 2:
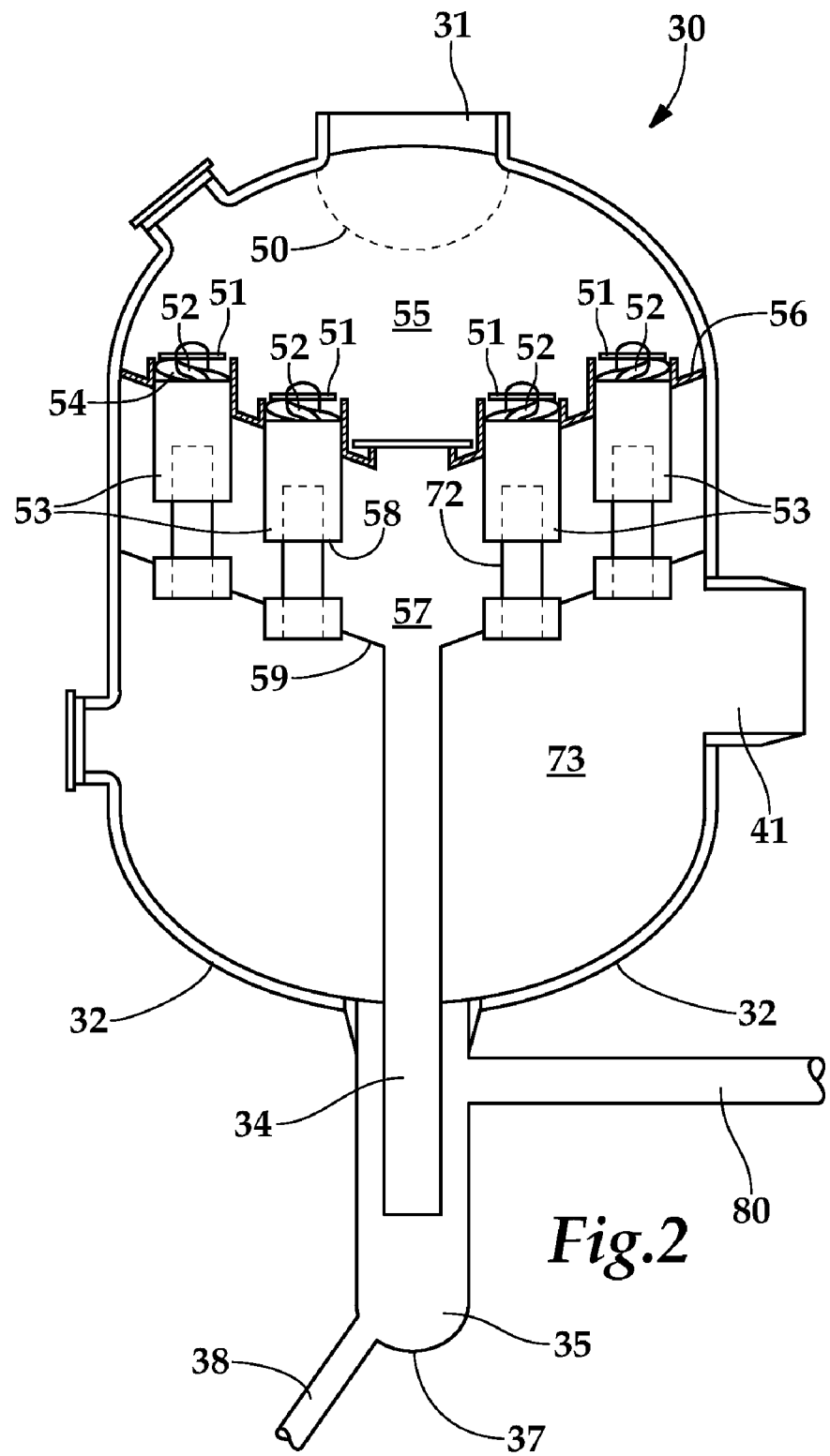
FIG. 2 is a cross-sectional elevation view of the multi-cyclone separator shown in FIG. 1.

As shown in FIG. 2, the multi-cyclone separator 30 receives the gaseous mixture via a separator inlet 31. The multi-cyclone separator 30 may contain numerous individual cyclones 53. Although only four cyclones 53 are represented in FIG. 2, between about 10 and about 200 cyclones 53 may be used depending on the size of the FCC unit. The separator inlet 31 may face an upper tube sheet 56 that retains top ends 54 of the cyclones 53. The upper tube sheet 56 at least partially defines an inlet chamber 55 and limits communication between the inlet chamber 55 and the rest of the multi-cyclone separator 30. The gaseous mixture may be distributed via a diffuser 50 to the inlets 51 of the plurality of cyclones 53 containing swirl vanes 52, which may be structures that restrict the passageway through which incoming gas can flow, thereby accelerating the flowing gas stream. The swirl vanes 52 may also change the direction of the gaseous mixture to provide a helical or spiral formation of gas flow through the length of cyclones 53. The spinning motion imparted to the gaseous mixture sends the higher-density catalyst toward the wall of the cyclone 53. The catalyst falls down the cyclones 53 and out of open bottom ends 58 into a solids chamber 57 defined between the upper tube sheet 56 and a lower tube sheet 59. In one embodiment the bottom ends 58 are closed and the catalyst exits slots formed in the wall of the cyclone 53. In another embodiment, the solids outlet tube 34 extends from the solids chamber 57 into a collection vessel 35 and transports solids collected on the lower tube sheet 59 into the collection vessel 35. As shown in FIGS. 1 and 2, the bottom of the multi-cyclone separator 30 may be defined by a hemispherical region 32 which is a clean gas area. Essentially all of the catalyst is transferred out of the multi-cyclone separator by the solids outlet tube 34.

Continuing with FIG. 2, clean gas, flowing down the center of cyclones 53, passes through open-ended cyclone gas outlet tubes 72 below the lower tube sheet 59 and into a clean gas chamber 73. The combined clean gas stream, representing the bulk of the gaseous mixture fed to the multi-cyclone separator 30 then exits into a main column line 41. The lower tube sheet 59 limits communication between the clean gas chamber 73 and the solids chamber 57.

Referring back to FIG. 1, a differential pressure controller 40 on the main column line 41 regulates differential pressure across the upper tube sheet 56 and the lower tube sheet 59 to regulate flow through the solids outlet tube 34. Catalyst level is regulated in a collection vessel 35 by use of the slide valve 39 in a spent catalyst return conduit 38. The differential pressure controller 40 keeps a slightly higher pressure in the multi-cyclone separator 30 than in the main column line 41. The pressure difference drives the flow of catalyst down the solids outlet tube 34. A transfer pipe 80 which connects the collection vessel 35 to the main column line 41 acts to equalize the pressure between the collection vessel 35 and the main column line 41, so that gas and catalyst may flow through cyclones 53 and the spent catalyst may be effectively separated from the cracked stream.

As shown in FIGS. 1 and 2, the bottom of the collection vessel 35 may be defined by the hemispherical region 37. The shape of hemispherical region 37 may help collect catalyst, so it will not enter the clean gas in main column line 41 though line 80.

The underflow may be the portion of the vapor that may be directed to the solids outlet tube 34 at the bottom of multi-cyclone separator 30. The amount of underflow corresponds to the amount of flow carrying the fines away from the clean cracked stream. The underflow rate may be typically between about 3 vol-% and about 5 vol-% of the total flow rate. In one instance the underflow would carry the catalyst into the collection vessel 35 where the level would be controlled by a slide valve 39 on the conduit 38. The underflow vapor would then turn back up the vessel 35 and into the transfer pipe 80 to the main column line 41 to the main column (not shown). There may be a critical flow orifice (not shown) on the main column line 41. The critical flow orifice may be a Venturi-type flow instrument that is naturally restrictive and allows a predetermined flow without the use of a control valve. The conduit 38 preferably returns separated catalyst from multi-cyclone separator 30 back to disengagement vessel 25. The catalyst then falls down stripping section 26 though baffles 27.

After passing through the multi-cyclone separator 30, at least about 98 wt-%, and in one embodiment at least about 99 wt-%, of entrained spent catalyst may be removed from the cracked stream. The catalyst recovered from the multi-cyclone separator 30 may be a second concentration of catalyst recovered.

The amount of steam required for an FCC unit without a reactor may be significantly less than in a traditional FCC unit. In a traditional FCC unit, acceleration steam input to the steam distributor 17 at the base of the riser 10, feed steam to the feed distributors 15 in the riser 10, stripping steam for stripping spent catalyst in the stripping section 26 prior to regeneration, fluidization steam to direct catalyst from a reactor vessel to a regenerator, and dome purge steam to purge the reactor shell are all necessary steam streams. In the FCC unit disclosed in FIG. 1, acceleration, feed and stripping steam are necessary, but there may be no need for fluidization steam and dome purge steam because there is no reactor vessel. Along with the elimination of the fluidization and purge steams, the respective steam control valves may also be eliminated. Less instrumentation may be necessary than in a traditional FCC unit because not as many thermocouples may be needed in an FCC unit without a reactor vessel. The number of thermocouples needed in the new FCC unit may be between about 5 and about 8, and in one embodiment about 6. Furthermore, the catalyst level and density taps and cyclone differential pressure taps may not be needed in an FCC unit without a reactor vessel. Without all the pressure taps, the dry-gas purge points may be decreased by at least about 30%, and in one embodiment by at least about 50%.

In the new FCC unit design, no dead areas in the unit may accumulate coke deposits and cause maintenance problems. In a traditional FCC unit, there may be dead spaces in the reactor and large expansion joints that get covered with coke in normal operation conditions. In the new FCC unit, about 100% of the riser 10, the primary separator 20, the disengagement vessel 25, the multi-cyclone separator 30, and the collection vessel 35 may be activated with flowing materials, so no coke deposits can accumulate.

Furthermore, the catalyst inventory to the new FCC system may be reduced because there may be no longer a reactor so the entire volume of the FCC unit may be reduced. The normal operating volume of catalyst necessary for the reactor cyclones and for the reactor dilute phase may be reduced. In one embodiment, a traditional FCC unit may utilize about 181,437 kg (about 200 tons). In the same embodiment, the FCC unit utilizing this invention may utilize about 154,221 kg (about 170 tons). For a traditional FCC unit, the new design should decrease the total catalyst inventory by between about 18,140 kg (about 20 tons) and about 45,360 kg (about 50 tons), and in one embodiment about 27,200 kg (about 30 tons). The decrease may be between an about 10 and an about 20 wt-% reduction in catalyst inventory, and in one embodiment about 15 wt-% reduction in catalyst inventory. Not only does this catalyst inventory decrease lead to decrease in initial catalyst loading costs, but it has the additional advantage of requiring less additives, such as NOx reduction, SOx reduction and propylene producing additives, to be added to the system to bring base catalyst loading up to design for the individual additives.

The invention claimed is:

1. A process for fluid catalytic cracking, comprising:
fluidizing a hydrocarbon stream in a riser;
cracking said hydrocarbon stream with catalyst in said riser to produce a cracked stream and spent catalyst;
separating said cracked stream and said spent catalyst in a primary separator to obtain a cracked stream with a first concentration of spent catalyst; and
transporting said cracked stream with said first concentration of spent catalyst through a conduit to a multi-cyclone separator comprising multiple cyclones extending through a tube sheet to obtain a cracked stream with a second concentration of spent catalyst.

2. The process according to claim 1, further comprising regenerating said spent catalyst to provide regenerated catalyst and recycling said regenerated catalyst to said riser.

3. The process according to claim 2, further comprising stripping said spent catalyst in a disengagement vessel encircling said primary separator prior to said regenerating step.

4. The process according to claim 1, further comprising collecting said second concentration of spent catalyst in a collection vessel below said multi-cyclone separator after obtaining said cracked stream with said second concentration of spent catalyst.

5. The process according to claim 1, further comprising providing a differential pressure in said multi-cyclone separator.

* * * * *